United States Patent [19]

Erickson et al.

[11] Patent Number: 5,449,718

[45] Date of Patent: * Sep. 12, 1995

[54] EPOXIDIZED VISCOUS CONJUGATED DIENE BLOCK COPOLYMERS

[75] Inventors: James R. Erickson, Katy; David J. St. Clair, Houston, both of Tex.

[73] Assignee: Shell Oil Company, Houston, Tex.

[*] Notice: The portion of the term of this patent subsequent to Jul. 20, 2010 has been disclaimed.

[21] Appl. No.: 130,169

[22] Filed: Sep. 30, 1993

Related U.S. Application Data

[60] Division of Ser. No. 084,683, Jun. 29, 1993, which is a continuation-in-part of Ser. No. 692,839, Apr. 29, 1991, Pat. No. 5,229,464.

[51] Int. Cl.⁶ .................. C08F 297/02; C08C 19/06
[52] U.S. Cl. ............................. 525/314; 525/250; 525/271; 525/338; 525/383; 525/387
[58] Field of Search ............ 525/314, 250, 271, 332.8, 525/333.1, 331.9, 338, 386, 387

[56] References Cited

U.S. PATENT DOCUMENTS

| | | | |
|---|---|---|---|
| 3,555,112 | 1/1971 | Winkler | 525/314 |
| 3,607,982 | 9/1971 | Winkler et al. | 525/314 |
| 4,051,119 | 9/1977 | Udipi et al. | 252/314 |
| 4,135,037 | 11/1978 | Upidi et al. | 428/414 |
| 4,135,725 | 12/1978 | Udipi | 525/386 |
| 4,237,245 | 12/1980 | Halasa et al. | 525/272 |
| 4,879,349 | 11/1989 | Hoxmeier | 525/332.8 |
| 5,149,895 | 9/1992 | Coolbaugh et al. | 585/507 |
| 5,210,359 | 5/1993 | Coolbaugh et al. | 585/507 |

FOREIGN PATENT DOCUMENTS 0396780 11/1990 European Pat. Off. .
0441485 8/1991 European Pat. Off. .

*Primary Examiner*—James J. Seidleck
*Assistant Examiner*—Mark L. Warzel
*Attorney, Agent, or Firm*—Donald F. Haas

[57] ABSTRACT

A viscous block copolymer of the formula $$(A-B-A_p)_n-Y_r-(A_q-B)_m$$

wherein Y is a coupling agent or coupling monomers, and wherein A and B are polymer blocks which may be homopolymer blocks of conjugated diolefin monomers, copolymer blocks of conjugated diolefin monomers or copolymer blocks of conjugated diolefin monomers and monoalkenyl aromatic hydrocarbon monomers, and wherein the A blocks have a higher number of more highly substituted aliphatic double bonds per unit of block mass than do the B blocks, and wherein the A blocks have a molecular weight from about 100 to about 3000 and the B blocks have a molecular weight from about 1000 to about 15,000, and wherein p and q are 0 or 1 and n>0, r is 0 or 1, m≧0 and n+m ranges from 1 to 100.

This block copolymer is preferably partially hydrogenated, epoxidized and crosslinked through at least some of the epoxy functionality to form an adhesive, coating or sealant composition.

22 Claims, No Drawings

EPOXIDIZED VISCOUS CONJUGATED DIENE BLOCK COPOLYMERS

This is a division of pending application Ser. No. 08/084,683, filed Jun. 29, 1993 which is a continuation-in-part of Ser. No. 07/692,839, filed Apr. 29, 1991, now U.S. Pat. No. 5,229,464.

BACKGROUND OF THE INVENTION

This invention relates to viscous conjugated diene block copolymers. Further, the invention relates to crosslinked epoxidized polymers made from such block copolymers and adhesive, coating, and sealant compositions made therefrom.

Curing of hot melt adhesives based on conjugated diolefins and, optionally, vinyl aromatics has increased the range of service properties for such adhesives. Radiation curing and chemical curing of polymers to make such adhesives is known. This curing causes covalent crosslinking of the polymerized conjugated diolefins which is evidenced by a high gel content of the crosslinked polymer. Before crosslinking, the polymers are melt processable but after crosslinking, the gel cannot be processed as melts. Crosslinking therefore enhances solvent resistance and improves elevated temperature shear properties. Compositions can therefore be applied to a substrate in a melt and then crosslinked to form a superior adhesive. However, improvements in the adhesives, coatings and sealants could be made if the adhesives could be processed at lower temperatures and cured at lower dosages of radiation.

Curing of solvent based of coatings and sealants based on these polymers has reduced solvent content required for such products. Radiation curing and chemical curing of these polymers to make coatings and sealants is known. Before crosslinking, the polymers are processable in solvent solution but after crosslinking, the gel cannot be processed as a solution. The crosslinking therefore enhances solvent resistance and improves toughness and cohesion. Compositions can therefore be applied to a substrate from solvent solution and then crosslink to form a superior coating or sealant. However, improvements in the coatings and sealants could be made if the coatings and sealants could be processed at higher solids content and cured at lower dosages of radiation or at lower temperatures in chemical cure.

Further, the known curable adhesives, sealants and coatings which are based on vinyl aromatics and conjugated diolefins do not have particularly good long term heat, weather and ultraviolet stability due to the need to utilize unhydrogenated polymers. The known vinyl aromatic-conjugated diolefin based adhesives, coatings and sealants which are curable are unhydrogenated polymers. Hydrogenation is known to improve long term heat, weather and ultraviolet stability, but it removes the double bonds which are needed to effect the curing by radiation crosslinking. Such curing methods are not effective when the polymers are hydrogenated. The requirement for this unsaturation is particularly evident when typical tackifiers are present in the compositions because their presence generally inhibits crosslinking of the polymer.

It is an object of the present invention to provide a block copolymer which can be modified so that it can be crosslinked, preferably by radiation, and which is easily processable in the melt or at high solids content before crosslinking but has a high gel content after crosslinking. Another object is to obtain a material which flows easily and does not have a strong elastic component prior to use. Further, it is an object of this invention to provide an adhesive, coating or sealant composition which is based on this crosslinking block copolymer.

SUMMARY OF THE INVENTION

The viscous block copolymers of the present invention have the formula

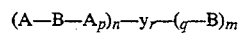

$$(A-B-A_p)_n-Y_r-(_q-B)_m$$

wherein Y is a coupling agent or coupling monomers or a multifunctional initiator, and wherein A and B are polymer blocks which may be homopolymer blocks of conjugated diolefin monomers, copolymer blocks of conjugated diolefin monomers or copolymer blocks of diolefin monomers and monoalkenyl aromatic hydrocarbon monomers. Also, the B blocks may be homopolymer or copolymer blocks of monoalkenyl aromatic hydrocarbon monomers. Generally, the A blocks should have a greater concentration of more highly substituted aliphatic double bonds than the B blocks have. The A blocks will have a greater concentration of di-, tri-, or tetra-substituted aliphatic double bonds. For example, in one embodiment, the A blocks will have a greater number of tertiary unsaturation (TU) sites per unit of block mass than the B blocks, where a TU site is defined to be an aliphatic double bond (ADB) between a tertiary carbon atom and either a primary or secondary carbon atom.

Tetra-substituted ADB

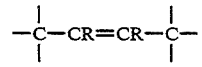

Tri-substituted ADB (a TU site)

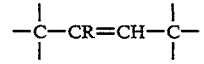

1,2-di-substituted ADB

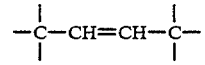

1,1-di-substituted ADB (a TU site)

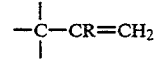

mono-substituted ADB

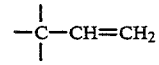

For example, polymer block A could be polyisoprene having about 14.7 milliequivalents of residual ADB's per gram, all of which would be di- and tri-substituted ADB sites (14.7 Meq TU/g), and polymer block B could be polybutadiene having 18.5 milliequivalents of residual ADB's per gram, all of which would be mono- and di-substituted ADB sites.

The A blocks have a molecular weight of from about 100 to about 3,000 and the B blocks have a molecular weight of from about 1000 to about 15,000. n is greater than 0, r is 0 or 1, m is greater than or equal to 0, and n+m ranges from 1 to 100. p and q may be 0 or 1. When either p or q or both are 1, extra highly substituted ADB sites are available in the interior of the polymer chain.

The block copolymers of the present invention may be partially hydrogenated, epoxidized or both partially hydrogenated and epoxidized. When these polymers are partially hydrogenated, it is recommended that they be hydrogenated to the extent that only from about 0.1 to about 3 milliequivalents of aliphatic double bonds per gram of polymer (0.1 to 3 Meq ADB/g) remain in the polymer. When these polymers are epoxidized, whether they are hydrogenated or not, it is preferred that the epoxidation take place only to the extent that about 0.1 to about 3 milliequivalents of epoxide per gram of polymer (0.1 to 3 Meq epoxide/g) are generated. Hence, the preferred epoxidized polymer has an epoxide equivalent weight of between abut 10,000 and about 333. When both partial hydrogenation and epoxidation are used, it is preferred that the amount of aliphatic double bonds in the polymer should be reduced to about 0.5 Meq/g or less by the combination of the two processes. The polymers may then be crosslinked through at least some of the epoxy functionality, preferably, by radiation.

DETAILED DESCRIPTION OF THE INVENTION

Polymers containing ethylenic unsaturation can be prepared by copolymerizing one or more polyolefins, particularly a diolefin, by themselves or with one or more alkenyl aromatic hydrocarbon monomers. The copolymers may be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthal ides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from I to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include isoprene (2-methyl-1,3-butadiene), 2-ethyl-1,3-butadiene, 2-propyl-1,3butadiene, 2-butyl-1,3-butadiene, 2-pentyl-1,3-butadiene (2-amyl-1,3butadiene), 2-hexyl-1,3-butadiene, 2-heptyl-1,3-butadiene, 2-octyl-1,3butadiene, 2-nonyl-1,3-butadiene, 2-decyl-1,3-butadiene, 2-dodecyl-1,3butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are 1,3-butadiene, piperylene, 4,5-diethyl-1,3-octadiene and the like. Di-substituted conjugated diolefins which may be used include 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene, 2,3-dimethyl-1,3-octadiene and the like and 2,3-fluoro-substituted conjugated diolefins such as 2,3-difluoro-1,3butadiene, 2,3-difluoro-1,3-pentadiene, 2,3-difluoro-1,3-hexadiene, 2,3-difluoro-1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

As described above, in general, the advantages of the present invention are achieved by utilizing an A block which contains more highly substituted aliphatic double bonds than the B blocks which should contain less highly substituted double bonds. One preferred specific example of this is the case where the A blocks are formed from isoprene monomer polymerized to give mostly cis-1,2-di-substituted residual ADB and the B blocks are formed from butadiene monomer. However, another special case is the situation wherein the A blocks are formed from 1,4-polybutadiene monomer addition (providing 1,2-disubstituted ADB) and the B blocks are formed from 1,2-polybutadiene monomer addition (providing mono-substituted ADB). Another special case is wherein the A blocks are formed from 2,3-dimethyl butadiene (tetra-substituted residual ADB after 1,4 addition) and the B blocks are formed from either isoprene or butadiene.

The present invention also encompasses polymers which have midblocks formed of monoalkenyl aromatic hydrocarbon monomers, preferably styrene (a minor amount, less than 50%, of a conjugated diene may be in this midblock). In this situation, the external (A) blocks would be conjugated dienes containing di-, tri- and/or tetra-substituted aliphatic double bonds and the internal (B) blocks would be formed of the monoalkenyl aromatic hydrocarbon. This type of polymer is not a rubbery polymer, but rather is a hard and friable solid. This type of polymer can be cured in situ to give a material with a hard reinforcing phase.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decal in and the like; linear and cyclic ethers such as dimethyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more branches or to terminally functionalize the polymer. The living chain ends are quenched with a proton source.

As stated above, the molecular weight of the A blocks varies from about 100 to about 3,000 because this molecular weight provides an adequate number of di-, tri- and/or tetra-substituted carbon to carbon double bonds that resist hydrogenation and/or allow easier functionalization, such as epoxidation, and subsequent crosslinking. The molecular weights of the B blocks range from about 1,000 to about 15,000 to provide flexible, short polymeric chains that limit the viscosity and especially the elasticity of the final uncured polymer. The B blocks are relatively easy to hydrogenate and/or more difficult to functionalize, such as by epoxidation, and, hence, they tend to remain more flexible than the A blocks after crosslinking. Polymers with monoalkenyl aromatic hydrocarbon monomer blocks are a special case and are hard at room temperature instead of flexible. Preferred versions of the block polymers of the present invention have A block molecular weights between about 300 and about 2,000, most preferably between about 600 and about 1,200, because the tighter ranges tend to provide the best balance of crosslinking site availability and viscosity control. The preferred B block molecular weight is between about 2,000 and about 10,000, most preferably between about 3,000 and 7,000, to minimize the polymer viscosity. In most cases, polymers which fall within the preferred molecular weight ranges are viscous liquids at room or slightly elevated temperatures as compared to most commercial conjugated diene-monoalkenyl aromatic hydrocarbon block copolymers or the copolymers of U.S. Pat. No. 3,607,982, which are relatively high molecular weight viscoelastic solids.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are measured. For anionically polymerized diblock polymers, diblock polymer is essentially monodisperse and it is both convenient and adequately descriptive to report the "peak" molecular weight of the narrow molecular weight distribution observed. The "peak" molecular weight is very nearly the same as the weight average molecular weight of the diblock. For diblock distribution that may not be monodisperse, a weight average molecular weight should be measured by light scattering or calculated from GPC data. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatoqraphy*, W. W. Yau, J. J. Kirkland, D. D. Bly, John Wiley & Sons, New York, NY, 1979.
2. *Light Scattering from Polymer Solution*, M. B. Huglin, ed., Academic Press, New York, NY, 1972.
3. W. Kaye and A. J. Havlik, *Applied Optics*, 12, 541 (1973).
4. M. L. McConnell, *American Laboratory*, 63, May, 1978.

Referring to the formula set forth in the Summary of the Invention section, especially useful polymers within the scope of the present invention are those that have a value of n greater than about 4 and especially preferred polymers are those that have a value of n greater than about 10. These polymers can be made especially reactive even when using low levels of epoxidation, such as about 0.1 to about 1.5 Meq epoxy/g, (polymers with epoxide equivalent weights of between about 10,000 and 667), because the number of epoxidized crosslinkable sites per polymer molecule is still relatively high. Also especially useful are polymers where the number of di-, tri- and/or tetra-substituted double bonds per unit of block mass on the A blocks exceeds that on the B blocks by a ratio of at least about 3:1, more preferably at least about 8:1, and most preferably by at least about 20:1, because this allows the polymer to be crosslinked in local regions with relatively uncrosslinked regions and spaced in between to provide flexibility if the polymer has been partially hydrogenated and epoxidized. When the end use for the polymer is for pressure sensitive adhesives or flexible coatings, it is often useful for the B block to contain little or no di-, tri- and/or tetra-substituted double bonds.

Diblock, 1 linear, radial and symmetric and asymmetric star copolymers are encompassed by the (A—B—A$_p$)$_n$—Y$_r$—(A$_q$—B)$_m$ nomenclature. The following are illustrative examples.

(A—B)$_1$ is a diblock polymer consisting of an A block and a B block and Y is absent. (A—B)$_1$YB$_1$ is a diblock polymer consisting of an A block and double B block, where the two B blocks are separated only by a difunctional coupling agent or initiator, Y (r=1). (A—B)$_1$B$_1$ is a diblock polymer consisting of an A block and a double B block made by a second sequential addition of B block monomers. Y is absent (r=0). A double B block may have a combined molecular weight of up to 30,000. (A—B)$_2$Y is a linear A—B—Y—B—A polymer that was made by coupling and a (A—B)$_2$ is a linear A—B—B—A polymer that was made by sequentially adding A, B, B, A block monomers. Y is absent. (A—B)$_4$Y is a symmetrical radial block copolymer where Y would usually be a tetrafunctional coupling agent. (A—B)$_2$YB$_2$ is an asymmetrical radial block copolymer. (A-B)$_{20}$Y is a symmetrical star block copolymer and Y would be a small number of multifunctional monomer monomers such as those obtained when the coupling monomer is divinylbenzene (DVB). (A—B)$_3$YB$_{17}$ is an asymmetrical star block copolymer. It can be conveniently made by initiating and polymerizing the A blocks and then adding more alkyl lithium to the reactor prior to adding the B-type monomers. Living A-B diblocks and B blocks will result that can be coupled with the appropriate agent, such as DVB. A statistical distribution of species will be made by this process, having the average (A-B)$_3$YB$_{17}$ composition. (A—B)$_{20}$Y(A—B)$_{20}$ is an asymmetrical star block copolymer prepared by coupling 20 A-B diblocks with a small number of coupling monomers, such as DVB monomer, and then adding A-type monomers followed by B-type monomers before quenching the living system with a proton source. In this case, Y is both a coupling agent and a multifunctional initiator.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as (AB)$_n$Y. Coupling monomers are coupling agents where several monomer units are necessary for every chain end to be coupled. Divinylbenzene is the most commonly used coupling monomer and results in star polymers.

Preparation of polymers which have controllable and predictable amounts of residual ethylenic unsaturation is disclosed in U.S. Pat. No. 4,879,349 which is herein incorporated by reference. The process disclosed therein includes copolymerizing substituted and unsubstituted conjugated diolefins and hydrogenating the copolymer under conditions which are effective to substantially hydrogenate the residual ethylenic unsaturation originating from the unsubstituted diolefin but leave the residual ethylenic unsaturation originating from the substituted diolefin substantially unhydrogenated. Partial hydrogenation utilizing the process described in this patent is preferred because of the excellent controllability of the amount of residual unsaturation. It is likely that better performance will be achieved when the catalyst disclosed in the patent is replaced by a titanium catalyst such as is disclosed in U.S. Pat. No. 5,039,755 entitled "Selective Hydrogenation of Conjugated Diolefin Polymers". Further, it is likely that better performance will be achieved if the polymerization process described in that copending application, utilizing termination of polymerization by hydrogen, is used herein.

When the polymers of the present invention are partially hydrogenated, they should be hydrogenated such that from about 0.1 to about 3 Meq/g of the aliphatic double bonds remain in the polymer because less than 0.1 does not give enough crosslinking and more than 3 gives too much without cost benefit. If unhydrogenated polymer or the partially hydrogenated polymer is to be epoxidized, then it is preferred that 0.1 to about 3 Meq/g of double bonds be consumed providing 0.1 to 3 Meq/g of epoxy functionality. It is preferred that the extent of the epoxidation be from about 0.5 Meq/g to about 1.5 Meq/g because this is the best compromise between lower cost and having sufficient epoxy groups for good crosslinking.

Some of the advantages of relatively low levels of epoxidation are:
  the manufacturing cost is lower because less epoxidizing agent is used;
  can maintain the polymer as an elastic material because the crosslinking will not be dense;
  the polymer will be more hydrophobic so water will be less of a problem; and
  the polymer can be formulated in conventional equipment.

When both hydrogenation and epoxidation are used, the best reactive polymers are those in which the amount of aliphatic double bonds has been reduced to about 0.5 Meq/g or less, preferably 0.2 Meq/g or less. This provides polymers that have better ultraviolet, ozone, weather and long term heat aging resistance. A preferred method of making hydrogenated epoxidized polymers is to partially hydrogenate the polymer first and then follow with as complete as possible epoxidation of the residual double bonds as discussed in the following paragraph. However, the process may be carried out by epoxidizing the polymer and then hydrogenating it.

Partial hydrogenation is diene selective. Generally, the rate of hydrogenation is slower for more highly substituted residual aliphatic double bonds than for less substituted aliphatic double bonds. The rate of epoxidation of carbon-carbon double bonds is generally just the opposite. Tetra-substituted and tertiary carbons promote epoxidation with peroxyacids better than secondary carbons, which in turn are better than primary carbons. The rate of epoxidation found using peracetic acid is believed to be as follows: tetra-substituted ADB>>cis-tri-substituted ADB>>1,1-di-substituted ADB>cis-1,2-di-substituted ADB>trans-1,2-di-substituted ADB>>trans-trisubstituted ADB or mono-substituted ADB. Thus, polymers of the present invention are especially suitable for the sequential use of both processes on the polymer. Use of partial hydrogenation alone on the present invention preferentially leaves a greater number per unit of weight of residual diene double bonds in the A blocks than the B blocks. Partial hydrogenation can be more selective to diene monomer type than epoxidation. For this reason, it is often better to partially hydrogenate first and epoxidize last when both processes are used on the present polymers. The effectiveness of this approach will be seen in the examples.

An epoxidized polymer of the present invention can be further derivatized by a subsequent reaction either separately or in-situ to provide useful reactive elastomeric binders that have reactive functionality other than the epoxy group. Epoxy groups can be converted to hydroxyl functionality, capable of crosslinking with amino-formaldehyde resins or isocyanates, of reaction with water. Reaction with azide ion, reaction with cyanotrimethylsilane followed by reduction or reaction with dialkylaminosilanes, ammonia, or amines will give polymers containing both amino and hydroxyl functionality that can be used to enhance adhesion to cellulosic substrates or provide reactive sites for isocyanate cure. Reaction with amino or mercapto acids can be used to prepare polymers containing hydroxyl and carboxylic acid functionality, providing greater adhesion to metals or to basic polymers such as nylon. Reaction with mercaptosilanes can be used to prepare polymers containing the elements of coupling agent, providing excellent adhesion to glass. These functional groups may also be introduced in the form of protected functional groups by reaction of the epoxy with the appropriately functionalized organometallic reagent (lithium organocuprates, Grignard reagents). Hydroxyl and aldehyde functionality may also be introduced by hydroformulation. Reactions with acrylamides and acrylic acids will introduce sites for free radical grafting. Further neutralization of the carboxylic acid or amine-containing polymer with base or acid will give varying amounts of water dispersability, depending on the level of functionality and neutralization.

A partially hydrogenated or unhydrogenated, but not epoxidized, polymer of the present invention can be further derivatized as well. Such a polymer can be brominated such as by reacting it with a solution of HBr in acetic acid. It can be reacted with maleic anhydride to give anhydride groups. Amine-functionalized unhydrogenated or partially hydrogenated polymers can also be made from the polymers of the present invention and should be useful for coating applications.

Epoxidation of the base polymer can be effected by generally known methods such as by reaction with organic peracids which can be performed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of about 0 to 130° C and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is sometimes preferable to carry out the epoxidation at the lowest possible temperature and for the shortest time consistent with the desired degree of epoxidation.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $O_2$ in the presence of tetra cyanoethylene. A temperature of about 150° C. and an oxygen partial pressure of about 58 atmospheres is suitable for this reaction.

The polymers of this invention are preferably cured by ultraviolet or electron beam radiation, but radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used.

The most common source of alpha, beta and gamma radiation are radioactive nuclei. An ionizing radiation source with commercial polymer crosslinking application is gamma radiation that is produced from either cobalt-60 or cesium-137 radioactive nuclei. X-rays can be produced through deacceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron ® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N. Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350-600 nm region of the spectrum. Fluorescent lamps, tungsten halide lamps and visible lasers may also be utilized.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another either crosslink with another epoxy oxygen, or terminate by recapturing an electron.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of about 0.1Mrads to about 10 Mrads are acceptable and from about 0.1 Mrads to about 5 Mrads are preferred because of equipment cost and possible damage to substrate material.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydroxyphenylsulfonium salts. The anions in these salts generally possess low nucleophilic character and include $SbF_6^-$, $BF_4^-$, $PF_6^-$ and $AsF_6^-$. Specific examples include (4-octyloxyphenyl )-phenyl-iodonium hexafluoroantimonate, UVI-6990 (from Union Carbide), and FX-512 (3M Company). Bis(dodecylphenyl)iodonium hexafluoroantimonate, UV 9310C(GE), and, UVI-6974 (Union Carbide), are especially effective. The onium salts can be used alone or in conjunction with a photosensitizer to respond to long wave length UV and visible light. Examples of photosensitizers include thioxanthone, anthracene, perylene, phenothiazine, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other diene-based polymers. Examples of epoxides include bis(2,3-epoxy cyclopentyl)ether, vinyl cyclohexene dioxide, limonene dioxide, epoxidized soya and linseed oils and fatty acids, vernonia oil, and UVI 6110 (Union Carbide).

The polymers may also be cured without the use of radiation by addition of a cationic initiator. Suitable initiators include the halides of tin, aluminum, zinc, boron, silicon, iron, titanium, magnesium and antimony, and the fluroborates of many of these metals. $BF_3$ complexes such as $BF_3$-ether and $BF_3$-amine are included. Also useful are strong Bronsted acids such as trifluoromethanesulfonic acid (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids and acid anhydrides and in general by the curing methods described in U.S. Pat. No. 3,970,608, which is incorporated by reference. Radiation crosslinking is preferred for adhesives because reactive ingredients do not come in contact with warm adhesives.

The crosslinked materials of the present invention are useful in adhesives ( including pressure sensitive adhesives, contact adhesives, laminating adhesives and assembly adhesives), sealants, coatings, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might o contain only the polymers of the present invention and the curing agent. However, in most coating and sealant applications, suitable formulations would also contain various combinations of resins, plasticizers, fillers, solvents, stabilizers and other ingredients such as asphalt. The following are some typical examples of formulations for coatings and sealants.

In coatings and sealant applications, as well as in adhesives it may be necessary to add an adhesion promoting or trackifying resin that is compatible with the polymer. A common tackifying resin is a diene-olefin copolymer of piperylene and 2-methyl-2-butene having a softening point of about 95 C. This resin is available commercially under the tradename Wingtack ® 95 and is prepared by the cationic polymerization of 60% piperlene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20-80 weight percent of piperylene and 80-20 weight percent of 2-methyl-2-butene. The resins normally have ring and ball softening points as determined by ASTM method E28 between about 80° C. and 1115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpene-phenol resins and polymerized mixed olefins, lower softening point resins and liquid resins. An example of a liquid resin is Adtac ® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex®371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

If the coating or sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxphenyl)propionate)methane (Irganox® 1010 from Ciba-Geigy) with tris(-nonylphenyl)phosphite (Polygard®HR from Uniroyal), Irganox®1010 with bis(2,4-di-t-butyl)pentaerythritol diphosphite (Ultranox®626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All adhesive, coating and sealant compositions based on the epoxidized polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

The only two Ingredients that will always be used in any adhesive coating or sealant are the epoxidized polymer and the curing agent which may be radiation, although, as discussed above, there are many types of curing agents from which to choose. Beyond these two ingredients, the formulator will choose to use or not to use among the various resins, fillers and pigments, plasticizers, reactive oligomers, stabilizers and solvents.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated epoxidized polymers may be needed to give adequate durability. Resins will be selected to assure maximum durability and minimum dirt pick-up. Fillers and pigment will be selected carefully to give appropriate durability and color. Coatings will frequently contain relatively high solvent concentration to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the epoxidized polymers of this invention to prepare adhesives, coatings and sealants having properties suitable for many different applications.

The adhesive, coating and sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation cure of hot adhesive is believed to promote faster cure than radiation cure at lower temperatures.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

Coating compositions of this invention can be used in many applications, depending on the hardness, adhesion, durability and cure conditions chosen by the formulator. A fairly soft coating formulated for low adhesion could be used as a protective strippable coating. A fairly soft coating formulated for high adhesion could be useful as a shatter retentive coating for glass bottles for carbonated beverages. A fairly hard coating formulated for high adhesion and long durability could be used as a corrosion protective coating for metals such as lawn equipment, automobiles, etc.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers.

Asphalt is another common material which can advantageously be combined with the polymers of the present invention. The asphalt may comprise a bituminous component which may be a naturally occurring bitumen or derived from a mineral oil. Also, petroleum derivatives obtained by a cracking process, pitch and coal tar can be used as the bituminous component as well as blends of various bituminous materials. Examples of suitable components include distillation or "straight-run bitumens," precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils. Compatible asphalts are preferred for use herein. Compatible asphalts are those which will give a blend which does not phase separate upon standing. The amount of asphalt used in the formulation can vary widely depending on the performance requirements of the particular application. However, asphalt will generally be in the formulation at about 0–95% w, more preferably 0–70% w and most preferably 0–30% w.

EXAMPLE 1

A (polyisoprene-polybutadiene). divinylbenzene star polymer was prepared in cyclohexane containing a small amount of diethyl ether cosolvent by the well known anionic polymerization method. For about every one mole of active initiator (sec-butyl lithium), 4.5 moles of 1,3-isoprene, 65 moles of 1,3-butadiene and 3.8 moles of technical divinylbenzene were added and polymerized successively, and the polymer was terminated with methanol. The technical divinyl benzene was DVB-55 from Dow, which consists primarily of mixed isomers of divinylbenzene and ethylvinylbenzene. The molar ratios correspond to the given % by weight composition for the polymer.

|  | weight % |
| --- | --- |
| butyl group | 1.3 |
| polyisoprene | 7.1 |
| polybutadiene | 80.4 |
| DVB-55 mixture | 11.2 |

Therefore, a (A-B).Y polymer had been produced where A was polyisoprene, B was polybutadiene, and Y was DVB. The peak diblock arm molecular weight, as determined by GPC, was about 3900. Thus, the polyisoprene block had a molecular weight of about 370 and consisted of one terminal butyl group and about 4 to 5 isoprene mers. The polybutadiene block had a molecular weight of about 3500 and consisted of about 65 butadiene mers. Thus, block A contained TU sites, about 12 Meq/g, while block B had no TU sites.

EXAMPLE 2

The above polymer solution of Example 1 was partially hydrogenated using a nickel-aluminum catalyst under conditions that will not hydrogenate aromatic double bonds but will preferentially hydrogenate aliphatic double bonds that are not TU sites, and the catalyst and the residual l lithium were washed out. The hydrogenation catalyst was made by the 20 reaction of nickel octoate and triethylaluminum, and was used at 15 ppm nickel, on a solution basis, at a pressure of 700 psi. A portion of the polymer was dried. Proton NMR analysis provided the following composition of residual double bonds.

| NMR Results | Weight % | Meq. ADB/g polymer |
| --- | --- | --- |
| 1,4 isoprene mer (tri-sub. ADB) | 3.5 | 0.51 |
| 3,4 isoprene mer (1,1-di-sub. ADB) | 1.2 | 0.18 |
| 1,4 butadiene mer (1,2-di-sub. ADB) | 1.2 | 0.22 |
| 1,2 butadiene mer (mono-sub. ADB) | 0.1 | 0.02 |
| other (hydrogenated mers and DVB) | 94.0 | |
| | 100.0 | 0.93 |

Thus, the partially hydrogenated polymer had A blocks which each consisted of one butyl group, and on average, about 3 isoprene mers with their residual ADB intact and about 1.5 hydrogenated isoprene mers. The B blocks, on average, each contained about 1 butadiene mer with its ADB intact and about 64 hydrogenated butadiene mers. The weight average molecular weight, $M_w$, of the partially hydrogenated polymer was measured by static light scattering. Dry polymer was dissolved in tetrahydrofuran and filtered through a .5 and a .2 micron filter. The analysis wavelength was 632.8 nm, the temperature was 25.0° C. and the DRI was 0.0884. The $M_w$ determined was 85,000. Dividing this $M_w$, less the DVB contribution, by the diblock peak molecular weight of about 3900 plus the small contribution due to hydrogenation, indicated that the star had about 19 dilock arms,n=. Hydrogenation of the polymer increased its viscosity, but the viscosity of the partially hydrogenated polymer both neat and dissolved in toluene was still low.

|  | Neat Viscosity | | |
| --- | --- | --- | --- |
| Temperature, °C. | 60 | 80 | 100 |
| Viscosity, cps | 37,000 | 14,000 | 5,700 |
|  | Toluene Solution Viscosity @ 25° C. | | |
| Solids, wt % | 40 | 50 | 60 |
| Viscosity, cps | 115 | 290 | 810 |

By way of comparison, the well known commercial hydrogenated polymers shown below are viscoelastic solids at room temperature through 100° C. and have typical toluene solution viscosities at 25% solids and 25° C. of

| KRATON ® G1650 | 800 cps |
| --- | --- |
| KRATON ® G1652 | 1350 cps |
| KRATON ® G1657 | 4200 cps |

EXAMPLE 3

The above partially hydrogenated polymer in solution was epoxidized with a solution of peracetic acid from FMC Corp. After neutralization with base and water washing, the polymer solution was poured out into a shallow pan and dried to recover the neat polymer. The polymer was found to be slightly more viscous after epoxidation than before. The polymer was analyzed by NMR to determine the number and type of residual double bonds.

| NMR results: | Weight % | Meq ADB/g polymer |
| --- | --- | --- |
| 1,4 isoprene (intact) | 0.3 | 0.04 |
| 3,4 isoprene (intact) | 0.6 | 0.09 |
| 1,4 butadiene (intact) | 0.1 | 0.02 |
| 1,2 butadiene (intact) | 0.0 | 0.00 |
| other (aliphatic, DVB) | 99.0 | |
|  | 100.0 | 0.15 |
| Meq/g for epoxide (from epoxide titration) | | 0.70 |

Thus, the A blocks each contained, on average, about 0.6 isoprene mers with their residual ADB intact and each B block contained little or no mers with their residual ADB intact. Hence, it can be inferred that the average A blocks contained a butyl group, about 2.4 epoxidized isoprene mers, and about 1.4 hydrogenated isoprene mers, while the average B block contained about 1.0 epoxidized butadiene mer and about 64 hydrogenated butadiene mers. Overall, each polymer molecule contained about 66 epoxide groups and about 13 residual aliphatic double bonds.

The amount of epoxy was also measured by the direct titration with perchloric acid (0.1N) and quaternary ammonium halogenide (tetraethylammonium bromide) where the sample was dissolved in methylene chloride. Epoxy titration is described in *Epoxy Resins Chemistry and Technology*, edited by Clayton A. May and published in 1988 (p. 1065) which is herein incorporated by reference. This method indicated that each polymer molecule contained about 60 epoxide groups.

EXAMPLE 4

The polymer of Example 3 is a gooey, viscous liquid at room temperature that has little internal (cohesive) strength. However, it is very easy to either warm melt or solution apply the neat polymer or the compounded polymer as a thin film to a substrate. Upon crosslinking through the epoxide groups, the polymer gains considerable cohesive strength without becoming brittle or inflexible and can be used to make useful pressure sensitive adhesives having high temperature service properties and solvent resistance as shown below.

| PSA formulation | 4A | 4B | 4C | 4D | 4E | 4F |
| --- | --- | --- | --- | --- | --- | --- |
| Polymer | 99.2 | 74.4 | 49.6 | 99.7 | 74.8 | 49.9 |
| Regalrez ® 1094 | 0.0 | 24.8 | 49.6 | 0.0 | 24.9 | 49.8 |
| Irganox ® 1010 | 0.3 | 0.3 | 0.3 | 0.3 | 0.3 | 0.3 |
| FC-520 | 0.5 | 0.5 | 0.5 | 0.0 | 0.0 | 0.0 |
|  | 100.0 | 100.0 | 100.0 | 100.0 | 100.0 | 100.0 |

Regalrez ® 1094 resin is a hydrogenated high softening point tackifying resin from Hercules, Irganox ®1010 antioxidant is a phenolic antioxidant from Ciba-Geigy and FC-520 is a solution of a salt of triflic acid from 3M Company.

Formulations 4A–4C were dissolved in toluene and cast onto Mylar film and the solvent was allowed to evaporate. About 1.5 mil dry films of a gooey material were obtained. The films were placed in an oven and baked at 149° C. for 20 minutes to convert the gooey, viscous films into useful pressure sensitive adhesives which have good cohesive strength. The polymer gel content of each of the films was measured by the test of reference which is described in the article "Experimental Thermoplastic Rubbers for Enhanced Radiation Crosslinking of Hot Melt PSA's" published in the May 1985 Hot Melt Symposium of TAPPI which is herein incorporated by reference. The results below show that the polymer crosslinks well.

| Formulation | Polymer gel content, % |
| --- | --- |
| 4A | 86 |
| 4B | 100 |
| 4C | 65 |

Formulations 4D–4F, which have no FC-520 catalyst in them, were similarly dissolved and cast onto Mylar and dried. They were given a short bake to simulate being hot melt extruded and were then treated under a nitrogen blanket with electron beam radiation using 165 kev electrons. Without EB treatment the film remain a gooey liquid having no gel content or other desirable properties. However, upon EB treatment they formed useful pressure sensitive adhesives (PSA) which have good cohesive strength. The polymer gel content results given below were obtained.

| Formulation | Polymer gel content, % | | | |
|---|---|---|---|---|
| Dose, Mrad | 0 | 3 | 5 | 7 |
| 4D | 1 | 57 | 95 | 100 |
| 4E | 1 | 53 | 69 | 78 |
| 4F | 1 | 48 | 67 | 73 |

The following results were obtained upon PSA testing of formulation 4B that was baked for 20 minutes at 149° C. and formulation 4E that was EB cured with 5 Mrads. A commercial high temperature, high performance automotive grade masking tape, 3M No. 233, was run as a control.

| | 4B | 4E | 3M No. 233 |
|---|---|---|---|
| 95° C. Holding Power to Mylar, min (1 in * 1 in * 500 g) | >1000 | >1000 | 621 |
| 23° C. Holding Power to Steel, min (1 in * 1 in * 500 g) | >4000 | >4000 | >4000 |
| 23° C. Polyken Probe Tack, grams | 760 | 520 | 340 |
| 23° C. 180 Peel from Steel, pli | 1.2 | 1.2 | 2.1 |

This illustrates that formulations of the present invention have properties similar to or better than the high performance commercial product.

The following Examples utilize polymers 101 and 202. 101 is an unhydrogenated epoxidized isoprene-butadiene star polymer with an arm molecular weight of 5800 and an epoxy content of 2.25 Meq/g. 202 is partially hydrogenated epoxidized isoprene-(random styrene/butadiene) star polymer with an arm molecular weight of 5800 and an epoxy content of 0.7 Meq/g.

EXAMPLE A

A clear, elastomeric coating was prepared with polymer 101 as follows. A solution containing 100 parts by weight (pbw) of the polymer 101, 1.5 pbw of a silicone resin (General Electric SR-882-M) and 1 pbw of blocked trifluoromethanesulfonic acid (3M FC-520) was prepared at 60%w solids content in a solvent blend of 75%w toluene and 25%w isopropyl alcohol. This coating was applied onto aluminum substrate (A412 panels ex Q-Panel Corporation) and dried to give about a 50 micron thick coating. The coated panels were cured for 20 minutes at 130 degrees Centigrade. Prior to cure, the dried coating was a very soft, tacky, viscous liquid. After cure, it was a clear, glossy, tack-free, elastomeric coating.

EXAMPLE B

Clear coatings having less elastomeric character were prepared with polymer 101 in combination with cycloaliphatic epoxy resin (ERL-4221 ex Union Carbide) as follows. The following coatings were prepared.

| Composition, pbw | 1 | 2 | 3 | 4 | 5 |
|---|---|---|---|---|---|
| Polymer 101 | 100 | 75 | 50 | 25 | 0 |
| ERL-4221 | 0 | 25 | 50 | 75 | 100 |
| SR-882-M | 1.5 | 1.5 | 1.5 | 1.5 | 1.5 |
| FC-520 | 1 | 1 | 1 | 1 | 1 |
| Toluene | 50 | 39.6 | 29.2 | 18.8 | 8.3 |
| Isopropyl alcohol | 16.7 | 13.2 | 9.7 | 6.3 | 2.8 |
| Solids Content, % w | 60 | 65 | 71 | 79 | 90 |

These coatings were applied onto aluminum panels (A412) and dried to give about 75 micron thick coatings. The coated panels were cured for 20 minutes at 130 degrees Centigrade. The following properties were measured for the coatings on the aluminum substrates after conditioning overnight at room temperature.

| Properties | 1 | 2 | 3 | 4 | 5 |
|---|---|---|---|---|---|
| Pencil Hardness | 4B | 2H | 4H | 6H | 6H |
| MEK Double Rubs | 40 | 160 | 200 | 200 | 200 |
| Adhesion | Low | Low | Fair | High | High |
| Gloss | High | Fair | Fair | Fair | High |

Results show that Composition 1 has fairly low pencil hardness as expected for an elastomeric coating. Results show that with increasing concentration of ERL-4221, the coatings become harder, have better MEK resistance and higher adhesion. Formulation 5 is extremely brittle.

EXAMPLE C

A clear coating was prepared with polymer 202 and a cycloaliphatic epoxy resin as follows. A coating was prepared having the same formulation a composition 2 in Example B except that polymer 202 was used instead of the polymer 101. The coating was applied and tested as in Example B. The following properties were measured.

| Properties | 1 |
|---|---|
| Pencil Hardness | H |
| MEK Double Rubs | 200 |
| Adhesion | Fair |
| Gloss | Fair |

Thus, the properties of this coating are very similar to the properties of Composition 2 in Example B. However, since polymer 202 contains a very low level of olefinic unsaturation, it would be expected to give much better durability and resistance to overbake.

EXAMPLE D

An ambient temperature curing, waterproofing coating is prepared with polymer and asphalt as follows. 70 pbw of 150 dmm penetration, unblown asphalt, 30 pbw of polymer 101 and 30 pbw xylene are mixed in a resin kettle for 1 hour at 70 degrees Centigrade. The blend is cooled to ambient temperature and 1 pbw of LEE-CURE B-110 (a blocked $BF_3$ catalyst from Leepoxy, Inc.) is added. The coating is applied onto concrete to give an elastomeric, waterproofing coating.

EXAMPLE E

An UV curable, strippable coating is prepared with polymer 101 as follows. 100 pbw of polymer 101 is mixed with 20 pbw of cyclohexane dimethanol divinyl ether (from ISP, Inc.) and 1 pbw of UVI-6974 (cationic photoinitiator from Union Carbide). This is coated onto glass and cured by exposure to UV radiation. It gives an elastomeric, protective coating which can be stripped cleanly off of the glass manually.

EXAMPLE F

A heat curable, weldable sealant is prepared with polymer 101 as follows. 100 pbw of polymer 101 is mixed with 100 pbw of WINGTACK 95, 100 pbw of ATOMITE and 100 pbw of ERL-4221 and 2 pbw of FC-520. This sealant is extruded onto one piece of steel. A second piece of steel is applied and welded to the first through the sealant. The steel is then primed with epoxy primer paint. The sealant cures in place when the steel is heated in the paint baking oven, giving a corrosion protective, waterproofing sealant in the space between the two pieces of steel.

We claim:

1. A viscous block copolymer of the formula $$(A-B-A_p)_n-Y_r-(A_q-B)_m$$

wherein Y is a coupling agent, coupling monomers or an initiator, and wherein A is a polymer block which is a homopolymer block of conjugated diolefin monomer, a copolymer block of conjugated diolefin monomers or a copolymer block of conjugated diolefin monomers and monoalkenyl aromatic hydrocarbon monomers, and wherein B is a polymer block which is a homopolymer or copolymer block of monoalkenyl aromatic hydrocarbon monomer(s) or a copolymer block of monoalkenyl aromatic hydrocarbon monomer(s) and a minor amount of a conjugated diene, and wherein the A blocks have a greater number of di-, tri- and tetra-substituted epoxides per unit of block mass than do the B blocks, and wherein the A blocks have a molecular weight from about 100 to about 3000 and the B blocks have a molecular weight from about 1000 to about 15,000, and wherein p and q are 0 or 1 and $n>0$, r is 0 or 1, $m \geq 0$ and $n+m$ ranges from 1 to 100; and wherein the copolymer is epoxidized such that 0.1 to 3 Meq/g of epoxide is present.

2. The block copolymer of claim 1 wherein the copolymer is crosslinked through at least some of the epoxy functionality by exposure to radiation.

3. The block copolymer of claim 1 wherein the copolymer is chemically crosslinked through at least some of the epoxy functionality.

4. An adhesive composition comprising the block copolymer of claim 2.

5. An adhesive composition comprising the block copolymer of claim 3.

6. A coating composition comprising the block copolymer of claim 2.

7. A coating composition comprising the block copolymer of claim 3.

8. A sealant composition comprising the block copolymer of claim 2.

9. A sealant composition comprising the block copolymer of claim 3.

10. The block copolymer of claim 1 which is partially hydrogenated before epoxidation such that the amount of aliphatic double bonds remaining in the copolymer is from 0.1 to 3 Meq/g polymer.

11. The block copolymer of claim 1 which has been epoxidized and hydrogenated such that the amount of aliphatic double bonds in the copolymer has been reduced to 0.5 Meq/g polymer or less.

12. The block copolymer of claim 10 wherein the copolymer is crosslinked through at least some of the epoxy functionality by exposure to radiation.

13. The block copolymer of claim 10 wherein the copolymer is chemically crosslinked through at least some of the epoxy, functionality.

14. An adhesive composition comprising the block copolymer of claim 12.

15. An adhesive composition comprising the block copolymer of claim 13.

16. A coating composition comprising the block copolymer of claim 12.

17. A coating composition comprising the block copolymer of claim 13.

18. A sealant composition comprising the block copolymer of claim 12.

19. A sealant composition comprising the block copolymer of claim 13.

20. A viscous block copolymer of the formula $$(A-B-A_p)_n-Y_r-(A_q-B)_m$$

wherein Y is a coupling agent, coupling monomers or an initiator, and wherein A is a polymer block which is a homopolymer block of conjugated diolefin monomer, a copolymer blocks of conjugated diolefin monomers or a copolymer block of conjugated diolefin monomers and monoalkenyl aromatic hydrocarbon monomers, and wherein B is a polymer block which is a homopolymer or copolymer block of monoalkenyl aromatic monomer(s) or a copolymer block of monoalkenyl aromatic hydrocarbon monomer(s) and a minor amount of a conjugated diene, and wherein the A blocks have a greater number of di-, tri- and tetra-substituted unsaturation sites per unit of block mass than do the B blocks, and wherein the A blocks have a molecular weight from 100 to 3000 and the B blocks have a molecular weight from 1000 to 15,000 and wherein p and q are 0 or 1 and $n>0$, r is 0 or 1, $m=0$ and $n+m$ ranges from 1 to 100; and wherein the copolymer is epoxidized such that 0.1 to 3 Meq/g of epoxide is present.

21. The block copolymer of claim 20 wherein the molecular weight of the A blocks ranges from about 300 to about 2,000 and the molecular weight of the B block ranges from about 2000 to about 10,000.

22. The block copolymer of claim 20 which has been partially hydrogenated such that the amount of aliphatic double bonds remaining in the copolymer is from 0.1 to about 3 Meq/g.

* * * * *